(12) United States Patent
Bourigault

(10) Patent No.: US 6,672,248 B2
(45) Date of Patent: Jan. 6, 2004

(54) DISPOSABLE BOWL ADAPTED TO BE EMPLOYED FOR PREPARING READY-FOR-USE FOOD FOR PETS

(75) Inventor: Patrice Bourigault, Cholet (FR)

(73) Assignee: Covi (FR)

( * ) Notice: Subject to any disclaimer, the term of this patent is extended or adjusted under 35 U.S.C. 154(b) by 0 days.

(21) Appl. No.: 10/265,551

(22) Filed: Oct. 4, 2002

(65) Prior Publication Data

US 2003/0066490 A1 Apr. 10, 2003

(30) Foreign Application Priority Data

Oct. 5, 2001 (FR) .............................. 01 12875

(51) Int. Cl.[7] .................... A01K 1/10; A01K 39/00; A01K 5/00
(52) U.S. Cl. ...................... 119/63; 119/51.01
(58) Field of Search ............... 119/51.01, 61, 119/63; 220/23.83

(56) References Cited

U.S. PATENT DOCUMENTS

| | | | | |
|---|---|---|---|---|
| 3,622,036 A | | 11/1971 | Bongaerts | |
| 3,810,446 A | * | 5/1974 | Kightlinger et al. | 119/61 |
| 4,716,855 A | * | 1/1988 | Andersson et al. | 119/61 |
| 4,798,173 A | * | 1/1989 | Wilgren | 119/61 |
| 4,880,112 A | * | 11/1989 | Conrad | 206/216 |
| 4,949,678 A | | 8/1990 | Demko | |
| 5,209,184 A | | 5/1993 | Sharkan et al. | |
| 5,526,773 A | * | 6/1996 | Richardson | 119/51.5 |
| 5,560,315 A | * | 10/1996 | Lampe | 119/51.5 |
| 5,743,210 A | * | 4/1998 | Lampe | 119/51.5 |
| 5,925,390 A | * | 7/1999 | Kornacki | 426/87 |
| 6,443,096 B1 | * | 9/2002 | Prydie | 119/61 |

* cited by examiner

Primary Examiner—Charles T. Jordan
Assistant Examiner—Judith A. Nelson
(74) Attorney, Agent, or Firm—Bachman & LaPointe, P.C.

(57) ABSTRACT

The first skirt portion has an outward extension in the form of a substantially smooth upper circumferential edge, wherein the upper edge itself has an extension in the form of a second skirt portion extending downwardly and outwardly to a lower circumferential edge. The bottom portion has on its lower face an adhesive member such as a two-sided adhesive. The ratio of the average inner diameter of the first skirt portion to the inner height of the bowl is at least about 3, and advantageously ranges from about 3.5 to 7.5, and preferably, from 4 to 6.

16 Claims, 1 Drawing Sheet

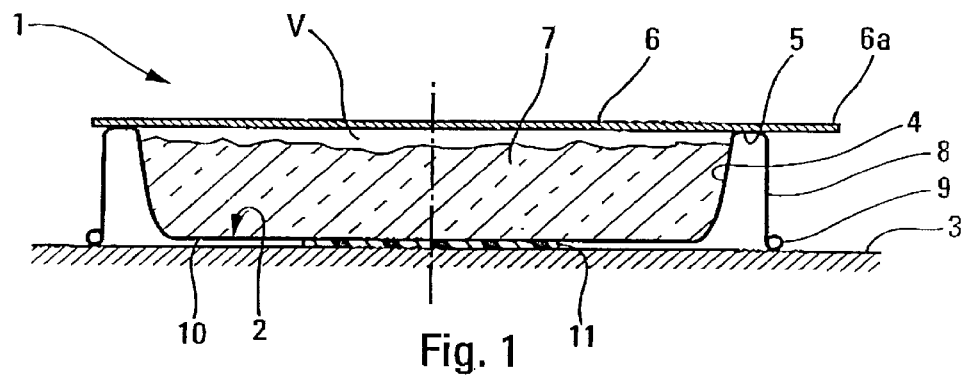
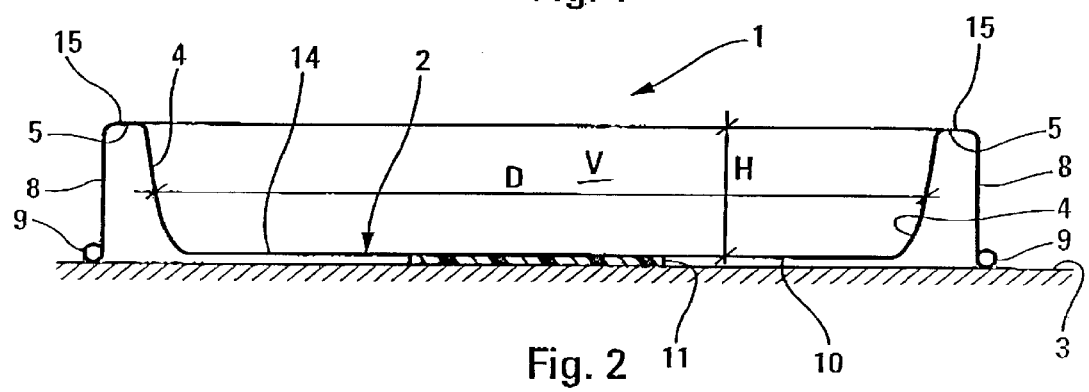
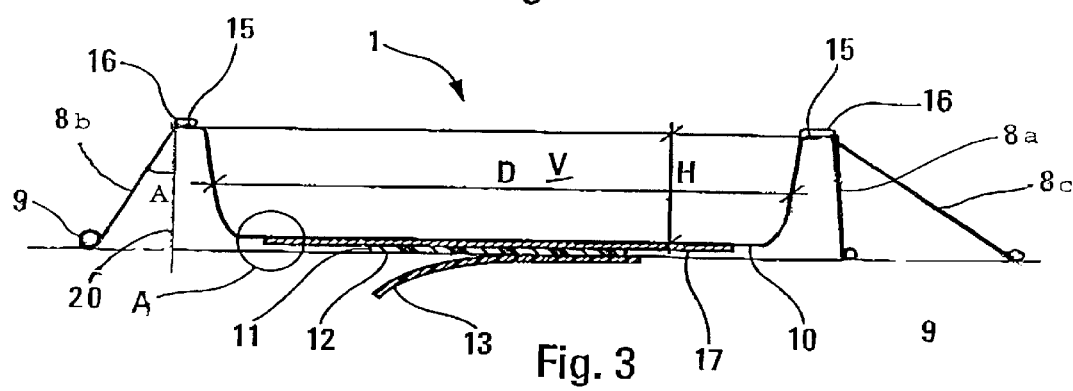
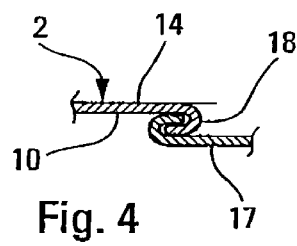

DISPOSABLE BOWL ADAPTED TO BE EMPLOYED FOR PREPARING READY-FOR-USE FOOD FOR PETS

The present invention relates to a disposable bowl adapted to be employed for preparing ready-for-use food and to contain an amount of food constituting a normally daily, substantially complete and balanced ration for a pet such as a dog or a cat Many types of disposable bowls are known.

In particular, a bowl is known, which comprises a substantially flat bottom portion extending upwardly and outwardly with at least a first skirt portion including at least one upper ring-shaped edge portion adapted to accommodate a removable capping for closing the bowl and protecting said food.

However, the known bowls have a shape that do not allow an animal to consume the food contained in said bowl directly therefrom, which requires said food to be carried in another container whose shape is better suited to the morphology of the animal in question.

This food transfer from the disposable bowl to a pan in which the animal can eat is disliked by users who have to manipulate the food, the disposable bowl and the pan, and must then dispose of the bowl after the food has been transferred and clean the pan after said food has been consumed by the animal.

It is an object of the present invention to remedy the drawbacks of known bowls and to provide a bowl of the above-mentioned type, which is shaped so as to allow the animal to consume directly and immediately from said bowl, as soon as the capping has been opened, the food contained therein, wherein the bowl can be disposed of after said food has been consumed by the animal.

According to the present invention, a bowl of the above-mentioned type is characterized in that the first skirt portion has an outward extension in a form of a substantially smooth upper circumferential edge, said upper edge itself having an extension in the form of a second skirt portion extending downwardly and outwardly to the lower circumferential edge, and in that:

- the bottom portion has on its lower face an adhesive member attached to said lower face and which has its adhesive free face coated with a peelable protective film;
- the bowl is shaped in such a way that, when the lower circumferential edge is in contact with a substantially flat floor, said free face of the adhesive member is also in contact with said floor substantially over its entire surface area;
- the ratio of the average inner diameter of the first skirt portion to the inner height of the bowl is at least about 3, advantageously ranges from about 3.5 to about 7.5, and preferably, from 4 to 6.

The tests carried out by the applicant have shown that the bowl according to the present invention, which is stable, strongly adheres to the floor through the adhesive member it comprises, and is adapted to the animal's morphology through its high ratio of the average inner diameter of the first skirt portion to the inner height of the upper edge, is perfectly suited to allow the animal to eat the food contained therein directly from said bowl.

In particular, the large diameter and the small height allow the animal to seize the pieces contained in the bowl laterally between its teeth.

According to another embodiment of the present invention, the ready-for-use dish according to the present invention containing a quantity of food constituting a normally daily, substantially complete and balanced, ration for a pet such as a dog or a cat, is characterized in that it comprises a bowl according to the first embodiment of the invention, wherein said bowl is closed by a removable capping and contains said substantially complete and balanced ration.

Other objects, advantages and features of the present invention will become apparent from the following specification taken in conjunction with the accompanying non-limiting drawings, wherein:

FIG. 1 is a schematic vertical cross-sectional view of a ready-for-use pet dish according to an embodiment of the present invention, which is particularly adapted to small animals such as cats and small dogs;

FIG. 2 is a partial view similar to FIG. 1 of another embodiment of the present intention, which is particularly suited to large animals, showing the bowl alone without its removable capping and without any content to simplify the drawing;

FIG. 3 is a partial view similar to FIG. 1 of a bowl according to a modification of the embodiment shown in FIG. 1 and showing several modifications relating to the shape of the second skirt portion;

FIG. 4 is an enlarged schematic view of a feature D shown in FIG. 3.

In the embodiment shown in FIG. 1, the disposable bowl 1 is used for preparing a ready-for-use dish, containing an amount of food constituting a normally daily, substantially complete and balanced ration for a pet such as a dog or a cat.

This bowl 1 has a substantially flat bottom which is adapted to be placed on a substantially flat floor 3.

The bottom portion 2 has an upward and outward extension in the form of at least one first skirt portion 4 including at least one ring-shaped edge 5 adapted to accommodate a removable capping 6 for closing the bowl 1 and protecting the food contained in said bowl 1, as schematically shown at 7 in the Figure.

According to the present invention, the first skirt portion 4 has an outward extension in the form of said ring-shaped edge 5, which is a substantially smooth upper circumferential edge, itself having an extension in the form of a second skirt portion 8 extending downwardly and outwardly to a lower circumferential edge 9.

The bottom portion 2 has on its lower face 10 an adhesive member 11 attached to said lower face 10 with its adhesive free face 12 coated with a peelable protective film of any known type, schematically shown in FIG. 3 at 13 in a slightly pulled up portion.

The bowl 1 is shaped so that when the lower circumferential edge 9 is in contact with a substantially flat floor 3, said adhesive free face 12 of the adhesive member 11 is also in contact with said floor 3 substantially over its entire surface area, so that the bowl 1 strongly adheres to the floor 3 by the adhesive member 11.

The adhesive member 11 may for example be a two-sided adhesive member, known per se, applied to the lower face 10 of the bottom portion 2.

The ratio R1 of the average inner diameter D of the first skirt portion 4 to the inner height H of the bowl 1 is at least about 3, advantageously ranges from about 3.5 to about 7.5, and preferably ranges from 4 to 6.

The average inner diameter D of the first skirt portion 4 is, for a first inner skirt portion 4 having a substantially circular cross-section and a substantially regular contour, the same as the diameter of the skirt portion 4 at a level which corresponds to half the inner height of said skirt portion 4 and bowl 1, this inner height H being the height from the upper face 14 of the bottom portion to the level of the upper face 15 of the upper edge 5.

For a first skirt portion 4 having a non-circular shape, for example an oval shape with a more intricate contour, the average inner diameter could also be computed based on the inner volume of the bowl, as being the diameter of a cylinder having the same inner height and the same inner volume as said bowl.

Similarly, the ratio R2 of the average inner diameter D to the cubic root of the useful volume V of bowl 1 ranges from about 1.6 to about 2.3, and advantageously, from about 1.7 to about 2.0.

Also, the ratio R3 of the inner height H to the cubic root of the useful volume V of bowl 1 ranges from about 0.28 to about 0.52, and advantageously, from 0.3 to 0.45, and preferably, from 0.325 to 0.425.

As may be seen in particular in FIG. 2, the upper edge 5 advantageously has a substantially flat ring-shaped portion 15 which facilitates the positioning and attachment of the removable capping 6.

The removable capping 6 is attached to the upper face 15 of the upper ring-shaped edge 5, for example through bonding and in particular, through heat bonding, and has, in a known way, a pull-off tongue 6a for pulling off the capping 6.

The bowl 1 may be made, for example, of a thin galvanized steel metal sheet. It could also be made of an appropriate plastic material.

Advantageously, the bowl 1 is coated, at least on the upper surface 15 of the upper ring-shaped edge portion 5, with a heat-melting material, as schematically shown at 16 in FIG. 3, for attaching the capping 6.

The whole upper surface of the bowl, from the bottom portion 2 to the upper edge portion 9, may be coated in such a way as to avoid any contact between the bowl material on the one hand, and the food 7 or the animals mouth, on the other hand.

As a modification, the removable capping 6 could comprise, on its face adapted to be brought in contact with said upper side 15 of the bowl upper edge portion 5, a heat-melting material.

Generally, the upper side of the bowl is smooth, the upper edge portion 5 is, along an axial cross-section, connected to the first inner skirt portion 4 and to the second outer skirt portion 8 through curved portions in order to avoid any sharp unevenness that might hurt the animal. Preferably, the bowl 1 is characterized by the absence of any square edge whether protruding or recessing between the bottom portion 2 and the lower edge portion 9, all connections between adjacent surfaces being realized as curved portions with appropriate radii for the animal to be allowed to consume all of the food contained in said bowl without any risk of being hurt and of food being blocked on the bowl surface.

In the embodiment shown in FIGS. 3 and 4, the bowl has a crimped bottom portion 17. As schematically shown in FIG. 4, the crimped bottom portion 17 is crimped to the lower face 10 of the bottom portion 2 along a flange 18 protruding outwardly and formed within said bottom portion 2. Of course, the crimped bottom portion 17 has the adhesive member 11 thereon. This crimped bottom portion 17 obviously allows for a quick fill-up of the bowl inner volume V through the bottom portion 2, and a very quick closure of the bottom portion 2 by crimping the crimped bottom portion 17 after filling-up.

We have thus defined, according to the above-disclosed criteria, two main models of bowl:

a small bowl, schematically shown in FIGS. 1 and 3, for cats and small dogs, for example, has an average diameter of 9.14 cm, an inner height of 2 cm, and has a ratio R1 ranging from 4.5 to 4.6, a ratio R2 ranging from 1.8 to about 1.85 and a ratio R3 of the order of 0.4. This bowl has an inner volume of 127 $cm^3$, a total height of 2.1 cm and an outer diameter of 10.9 cm, a large bowl, for dogs of medium height, having a useful volume of about 349 $cm^3$, schematically shown in FIG. 2. This bowl has an average inner diameter of about 13.4 cm, an inner height of about 2.5 cm, and has a ratio R1 ranging from 5 to 5.5, a ratio R2 ranging from 1.9 to 1.95, and a ratio R3 ranging from 0.35 to 0.4. This bowl has a total height of 2.6 cm, and an outer diameter of about 15.4 cm.

Each of these two bowls has a first inner skirt portion flaring upwardly and outwardly with an angle of 10° relative to the bowl axis, and is made of a galvanized steel sheet of 0.12 mm in thickness coated on its top face with a polypropylene film and on its lower face with a varnish. The capping is made of a 40- to 70-micron thick aluminum foil coated with a thermosealing varnish or a polypropylene film.

Of course, bowls with intermediate sizes are possible, as well as bowls with larger or smaller dimensions.

What has been described so far is a general model of bowl and two particular bowl models for animals of small height and medium height, which are the most numerous consumers of food such as potted meat or pâté or mash or meats cooked in a sauce.

These bowls have such dimensions that each of them can be used as a bowl from which the animal can easily and cleanly eat the food contained in said bowl, in a routine manner and not exceptionally.

In the embodiment of FIGS. 1 and 2, the second skirt portion 8 is substantially perpendicular to the bottom portion 2: such an embodiment, which does not allow the empty bowls to be piled one on top of the other before being filled, has the advantage of exposing a full bowl in a substantially vertical position by presenting customers and users a view of the outer face of its capping 6, generally decorated with advertising.

In the embodiment shown in FIG. 3, the skirt portion 8 forms with the direction 20 perpendicular to the bottom portion 2 an angle A which may have any value compatible with the animal's morphology, on the one hand, and with the possibility of piling up empty bowls on top of each other, on the other hand, without particular technical, industrial, economical and aesthetic drawbacks.

Thus, in the case of skirt 8a schematically shown on the right hand side of the figure, angle A is about 5°, in the case of skirt 8b on the left hand portion of the figure, angle A is about 30°, and in the case of skirt 8c on the right hand side of the figure, angle A is about 55°.

Generally, angle A normally ranges from 2° to about 60°, and advantageously, from about 5° to 45°, and preferably, form about 8° to 25°.

Thus, there has been described a ready-for-use dish according to the present invention, and a bowl adapted to be used for preparing such a dish.

The food contained in said dish may be in the form of a potted meat or a less dense mix of meat in pieces or balls, and vegetables, or other sauce garnishing according to any known composition and recipe.

This food may also be in the form of substantially dry agglomerated croquettes or balls. In this case, the food has a smaller bulk density due to the voids between the croquettes or balls, and the ration contained in the dish occupies a larger volume than that of the ration provided in the form of potted meat or a meat mixture cooked in a sauce.

The bowl containing croquettes may be of a larger size than the howl containing potted meat of a meat mixture cooked in a sauce, while the above-described geometric proportions and other characteristics remain unchanged.

Of course, this invention is not restricted to be above-disclosed embodiments, and these may be changed and modified within the scope of the present invention.

Thus, the inner skirt portion 4 and the outer skirt portion 8 may be provided with a cross-sectional shape different from the shapes described and shown in the figures, provided that square edges and edges with too small radii, protrusions, corners and more generally, any unevenness liable to form a narrow space wherein attached food remains out of reach from the animal in question are avoided.

What is claimed is:

1. A disposable bowl adapted to be employed for preparing a ready-for-use dish and to contain an amount of food constituting a normally daily substantially complete and balanced ration for a pet animal, wherein the bowl comprises a substantially flat bottom portion having an upward and outward extension in the form of at least one skirt portion having at least one ring-shaped edge for accommodating a removable capping for closing the bowl and protecting said food, said at least one skirt portion comprising a first skirt portion having an outward extension in the form of a substantially smooth upper circumferential edge, said upper edge having an extension in the form of a second skirt portion extending downwardly and upwardly to a lower circumferential edge, the bottom portion having on a lower face an adhesive member attached to said lower face, adhesive member having an adhesive free face covered with a peelable protective film; the bowl being shaped in such a way that, when the lower circumferential edge is in contact with a substantially flat floor, said adhesive free face of the adhesive member is also in contact with said floor substantially over it's entire surface area; and the ratio of an average inner diameter of the first skirt portion to an inner height of the bowl is at least about 3.

2. The bowl according to claim 1 wherein said ratio is in the range of about 3.5 to 7.5.

3. The bowl according to claim 1, wherein said ratio is in the range of 4.0 to 6.0.

4. The bowl according to claim 1, further comprising a ratio of the average inner diameter to a cubic root of a useful volume of the bowl ranges from about 1.6 to about 2.3.

5. The bowl according to claim 4, wherein said ratio of the average inner diameter to the cubic root of the useful volume is in a range from about 1.7 to 2.0.

6. The bowl according to claim 1, characterized in that a ratio of the inner height to a cubic root of a useful volume of the bowl ranges from about 0.28 to about 0.52.

7. The bowl according to claim 6, wherein the ratio of the inner height to the cubic root of the useful volume is in the range from about 0.3 to 0.45.

8. The bowl according to claim 6, wherein the ratio of the inner height to the cubic root of the useful volume ranges from 0.325 to 0.425.

9. The bowl according to claim 1, wherein the upper edge has on its upper face a substantially flat ring-shaped portion parallel to said bottom portion.

10. The bowl according to claim 1, wherein said movable capping is attached to a lower face of said upper edge through bonding.

11. The bowl according to claim 10, wherein said removable capping is attached to said lower face of said upper edge by heat bonding.

12. The bowl according to claim 1, wherein said bottom portion is a crimped bottom portion.

13. The bowl according to claim 1, wherein said bowl is made of a thin galvanized steel sheet.

14. The bowl according to claim 1, wherein said bowl is coated at least on an upper surface of said upper edge with a heat-melting material.

15. The bowl according to claim 1, wherein an upper face of said bowl is smooth.

16. A ready-for-use dish containing an amount of food constituting a normal daily, substantially complete and balanced ration for a pet animal, said dish comprising a bowl according to claim 1, and said bowl being closed by a removable capping and containing said substantially complete ration.

* * * * *

UNITED STATES PATENT AND TRADEMARK OFFICE
CERTIFICATE OF CORRECTION

PATENT NO. : 6,672,248 B2  Page 1 of 1
DATED : January 6, 2004
INVENTOR(S) : Patrice Bourigault It is certified that error appears in the above-identified patent and that said Letters Patent is hereby corrected as shown below:

Column 5,
Line 21, delete "it's" and insert -- its --.

Signed and Sealed this

Thirteenth Day of June, 2006

JON W. DUDAS
*Director of the United States Patent and Trademark Office*